United States Patent [19]

Porter

[11] Patent Number: 4,920,723
[45] Date of Patent: May 1, 1990

[54] HOLLOW GRANITE BOX BEAM AND METHOD OF FORMING

[75] Inventor: Douglas R. Porter, Mount Airy, N.C.

[73] Assignee: The L.S. Starrett Company, Athol, Mass.

[21] Appl. No.: 383,203

[22] Filed: Jul. 21, 1989

[51] Int. Cl.$^5$ ............................................. E04C 2/04
[52] U.S. Cl. ...................................... 52/606; 52/731; 156/154; 156/257; 33/DIG. 11
[58] Field of Search .................. 52/731, 720, 732, 221, 52/606, 612, 607; 33/503, DIG. 11, 573, 561, 559; 125/1, 12; 156/154, 257

[56] References Cited

U.S. PATENT DOCUMENTS

| | | | |
|---|---|---|---|
| 217,479 | 7/1879 | Pierson | 138/157 |
| 378,561 | 2/1888 | Waring | 138/157 |
| 1,313,269 | 8/1919 | Custer | 125/1 |
| 1,367,643 | 2/1921 | Van Nostrand | 138/157 |
| 2,410,877 | 11/1946 | Hall | 33/DIG. 11 |
| 3,638,934 | 2/1972 | Blum et al. | |
| 4,155,173 | 5/1979 | Sprandel | 33/559 |
| 4,177,789 | 12/1979 | Marocco | 125/1 |
| 4,763,420 | 8/1988 | McCabe et al. | |
| 4,822,661 | 4/1989 | Battaglia | 125/1 |

OTHER PUBLICATIONS

Starrett, Product Catalog No. 28, 2nd edition, 1988.

*Primary Examiner*—John E. Murtagh
*Attorney, Agent, or Firm*—Fish & Richardson

[57] ABSTRACT

A box beam comprises at least two elongated component blocks of granite, each containing at least one flat surface, the flat surfaces having identical dimensions. Igneous rock material is removed from the flat surface of at least one of the component blocks so as to form at least one open cavity in that component block. The interior cavity has boundary walls of a predetermined, though not necessarily uniform, thickness. The two component blocks are then bonded together along the remaining unremoved portions of the flat surfaces so as to form a box beam.

The system described above for manufacturing hollow granite box beams reduces weight while maintaining stiffness comparable to that of the composite ceramic or metal beams along with the inherent stability of granite, e.g., low coefficient of thermal expansion, in a highly efficient manufacturing process.

35 Claims, 4 Drawing Sheets

4,920,723

HOLLOW GRANITE BOX BEAM AND METHOD OF FORMING

BACKGROUND OF THE INVENTION

This invention relates to beams of igneous rock.

It has long been known that igneous rock materials are extremely stable. Granite, for example, has a very low coefficient of thermal expansion, and very high tensile strength. As such, granite and like igneous rock materials have been widely accepted in the building and industrial arts where a material of high stability is required.

In particular, beams of granite have been used to fabricate precision guide surfaces for various precision instruments, such as coordinate measuring machines and circuit board drilling machines. Granite heretofore, however, has not proved to be a completely satisfactory material for such uses, largely because of its weight. Granite is very dense, and therefore a solid granite beam of a given size significantly outweighs an analogous hollow beam of steel, aluminum, or cast ceramics. Manufacturers of precision instruments have increasingly been using these materials in lieu of granite on account of lower transport costs, stress tolerances, and other weight-related factors. These materials, however, have also proved to be unsatisfactory. Cast ceramics, for example, has similar tensile strength and thermal expansion properties as igneous rock, but are generally much more expensive. On the other hand, steel and aluminum have higher coefficients of thermal expansion.

SUMMARY OF THE INVENTION

A hollow box beam of igneous rock comprises two component blocks, at least one of which has had igneous rock material removed to form an interior cavity. After the cavity is formed, the two component blocks are bonded together such that the interior cavity becomes an enclosed cavity in said box beam, thus forming a hollow box beam.

The method for constructing this box beam comprises forming at least one flat surface on each of the two component blocks, with each of these flat surfaces having identical dimensions for later mating and bonding. Igneous rock material is then removed from the flat surface of one or both these component blocks so as to form at least one open cavity in the component block. The thickness of the cavity wall is determined by the amount of material removed from the component block. Thus the thickness of the cavity wall is predetermined by the remover at the time of construction, and is not necessarily uniform though it may be so. The two component blocks are then mated and bonded together along the remaining unremoved portions of the flat surfaces, thus forming the box beam.

In another aspect of the invention, the two component blocks are formed by dividing a single elongated parent block in a direction parallel to the longitudinal axis of the parent block. The required flat surfaces are thus created by the division of the parent block into the two component blocks.

In yet another aspect of the invention, the flat surfaces of at least one of the two component blocks is ground such that there exists unremoved portions, constituting a gusset, positioned in the cavity so as to intersect with the other component block upon bonding. This gusset enhances the overall strength of the box beam after bonding.

In yet another aspect of the invention, a plurality of box beams are constructed from the two component blocks. This is accomplished by removing the igneous rock material from at least one of the component blocks so that a plurality of interior cavities are provided in each of the component blocks, each of these interior cavities being separated by unremoved divider portions having a width greater than that of the predetermined thickness of the cavity walls. After the igneous rock material has been removed the component blocks are separated into the respective box beams by dividing the component block longitudinally at approximately the center of the unremoved divider portions to form first sections of each of the plurality of box beams. The other component block is then longitudinally divided so as to form a second section of the plurality of box beams. The dimensions of each interfacial surface of the second sections are to be substantially identical with those of the corresponding first section. After the component blocks have been divided, the respective first and second sections of the plurality of box beams are bonded together along their respective interfacial surfaces. A gusset may be provided in this embodiment of the invention as well. The igneous rock box beam manufacturing system disclosed herein produces relatively low cost beams with intrinsic stability and reduced weight comparable to ceramic or metal beams.

DESCRIPTION OF THE PREFERRED EMBODIMENTS

The manufacturing techniques described below are designed specifically for use in making hollow granite box beams for horizontal arms in coordinate measuring machines, for example, as a substitute for the solid granite cross beam in the Starrett RMS 1620-12 coordinate measuring machine Starrett Catalog No. 28, p. 443–444 2d ed. incorporated by reference herein. The system is applicable, however, to the manufacture of box beams for other applications.

Figure 1:
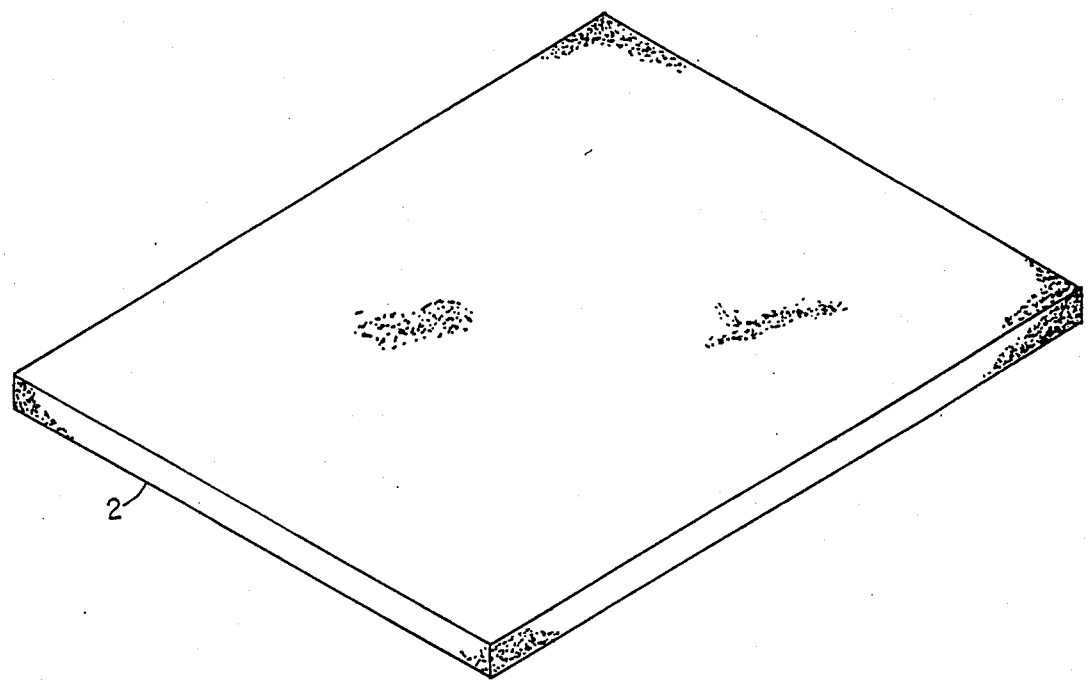
FIG. 1 is a schematic perspective diagram illustrating the components of a granite box beam constructed according to the invention.
Figure 1:
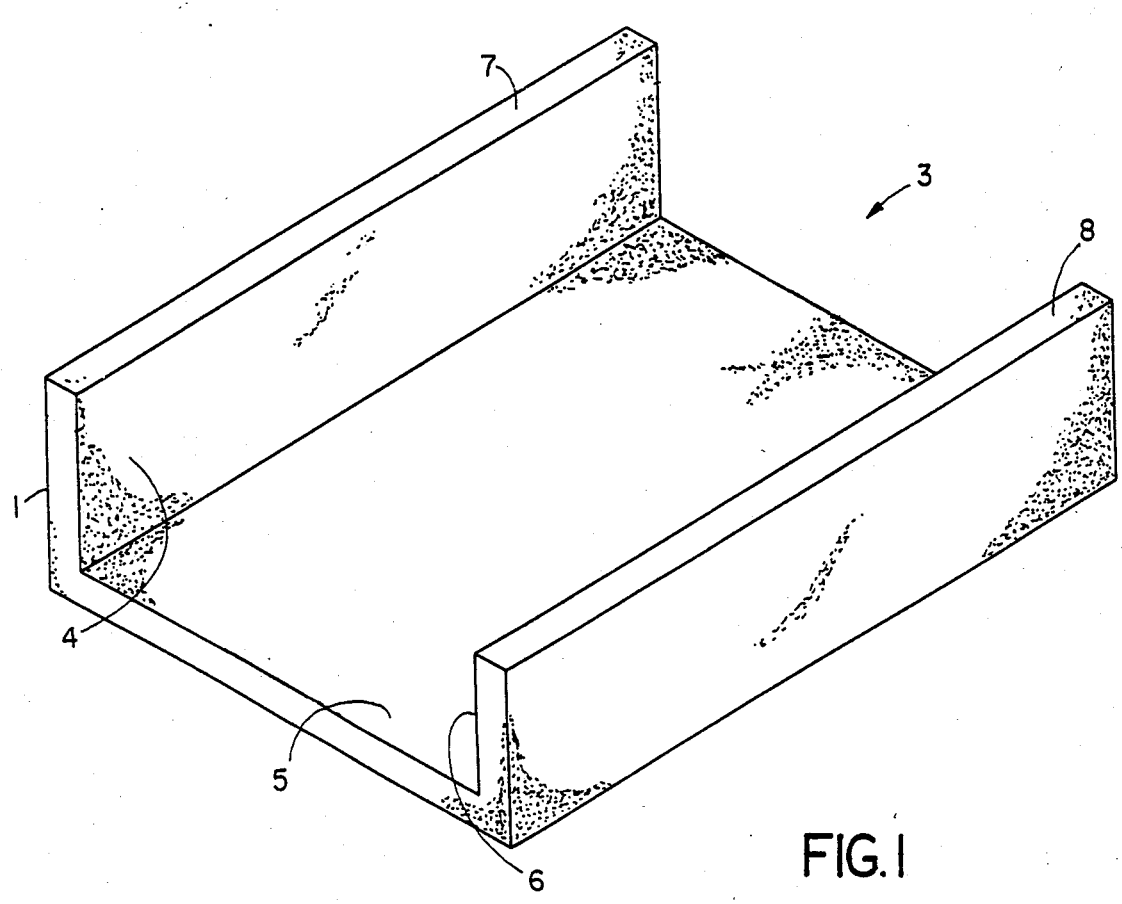

As shown in FIG. 1, two elongated blocks 1 and 2 of granite or other igneous rock are shown. One component block 1 has had granite removed from the center by means of grinding, for example, whereby a central cavity is formed 3, surrounded by boundary walls 4, 5, 6 each having a predetermined, though not necessarily uniform thickness. The unremoved portions of the flat surface of the first component block 7, 8 are precision ground as is the mating underside of the second component 2. The precision ground areas are then gently sandblasted to frost the surfaces. Both surfaces are then bonded using a high tensile strength epoxy, such as Plast No. 67-A-83, available from Fibre Glast Development Corporation.

The component blocks 1, 2 may be from either separate pieces of granite, or from a single parent block. In the latter case, the parent block would be divided, preferably by a single saw cut, to provide the flat surfaces on both component blocks.

Figure 2:
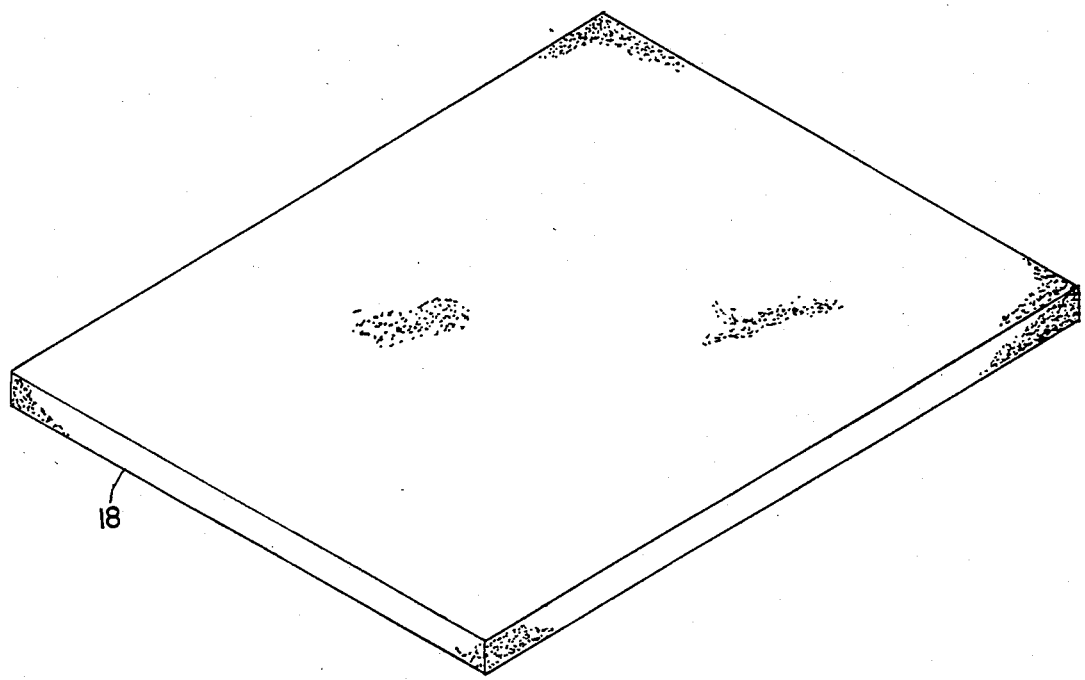
FIG. 2 is a schematic perspective diagram illustrating a variation on the box beam of FIG. 1 including a central gusset.
Figure 2:
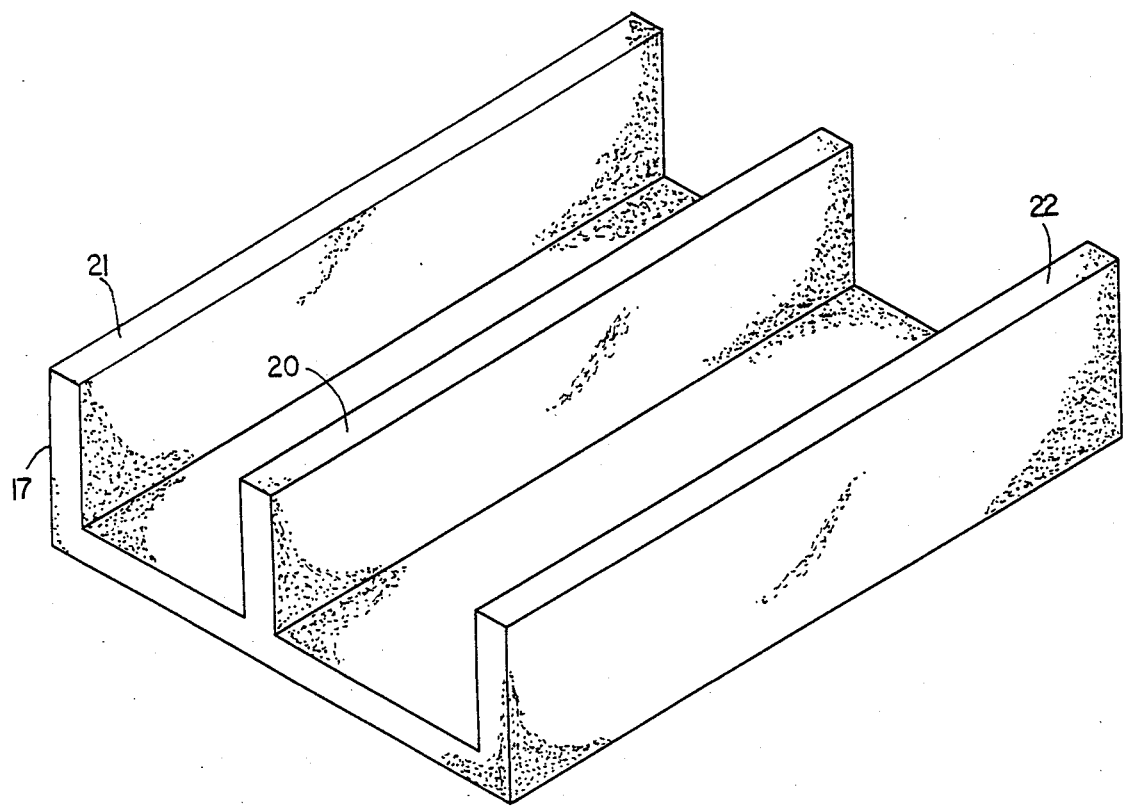

The preferred embodiment of FIG. 2 differs from that described above in that an unground portion 20 is left in the central region of the interior cavity of a first component block 17. This unground portion constitutes a strengthening gusset which is precision ground and sandblasted-- along the exterior unground portions 21, 22, and is to be co-planar with the exterior unground portions 21, 22, i.e., in that the plane, so that when the second component block 18 is bonded to the first 17, the gusset 20 is bonded by epoxy with the second component block 18, as are the exterior unground portions 21, 22.

Figure 3:
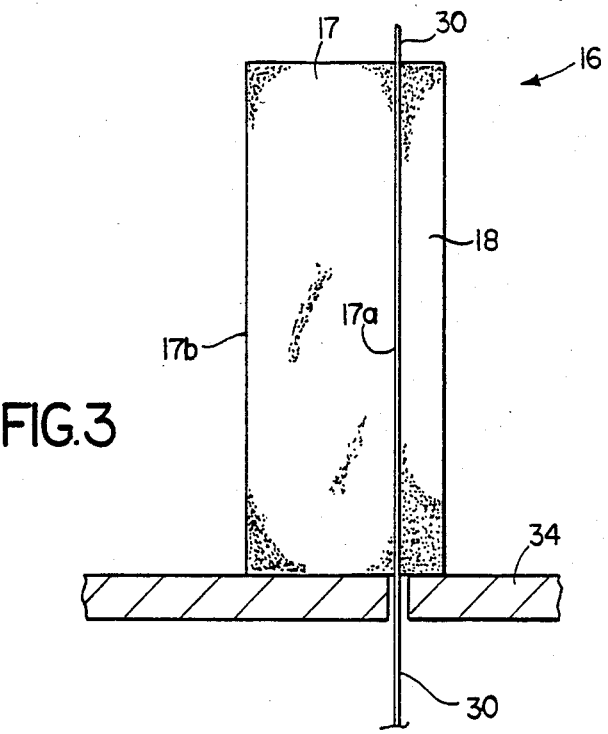
FIG. 3 is a schematic diagram illustrating one way of forming body and top blanks for the component blocks of FIG. 2.
Figure 4:
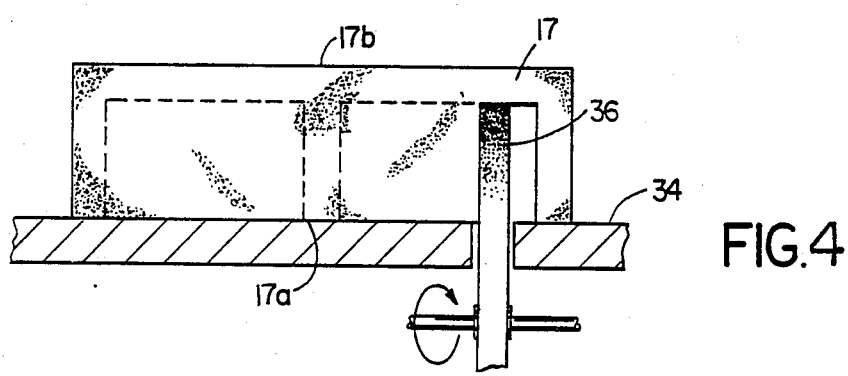
FIG. 4 is a schematic diagram illustrating the grinding operation for forming the gussetted body block of FIG. 2.
Figure 5:
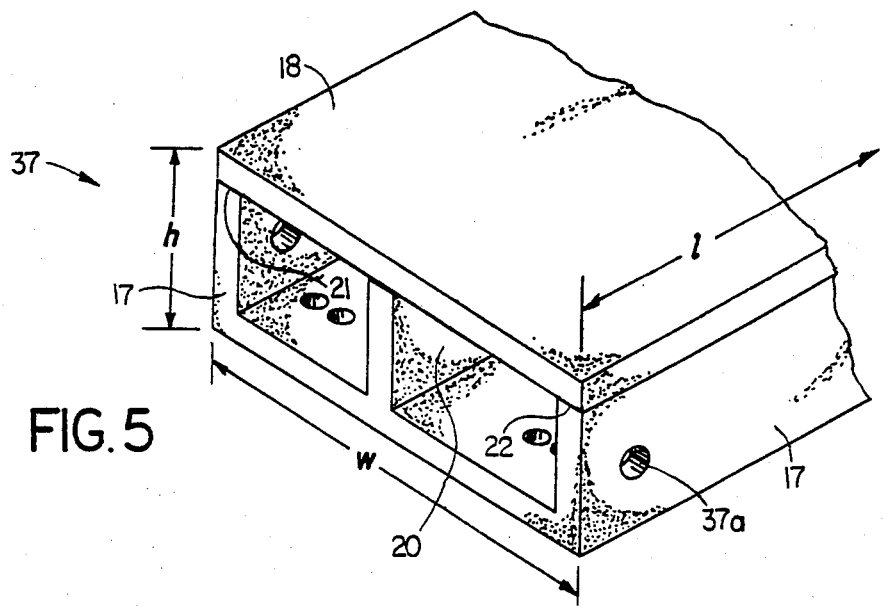
FIG. 5 is a schematic perspective diagram illustrating the finished hollow granite box beam of the embodiment of FIG. 2.
Figure 6:
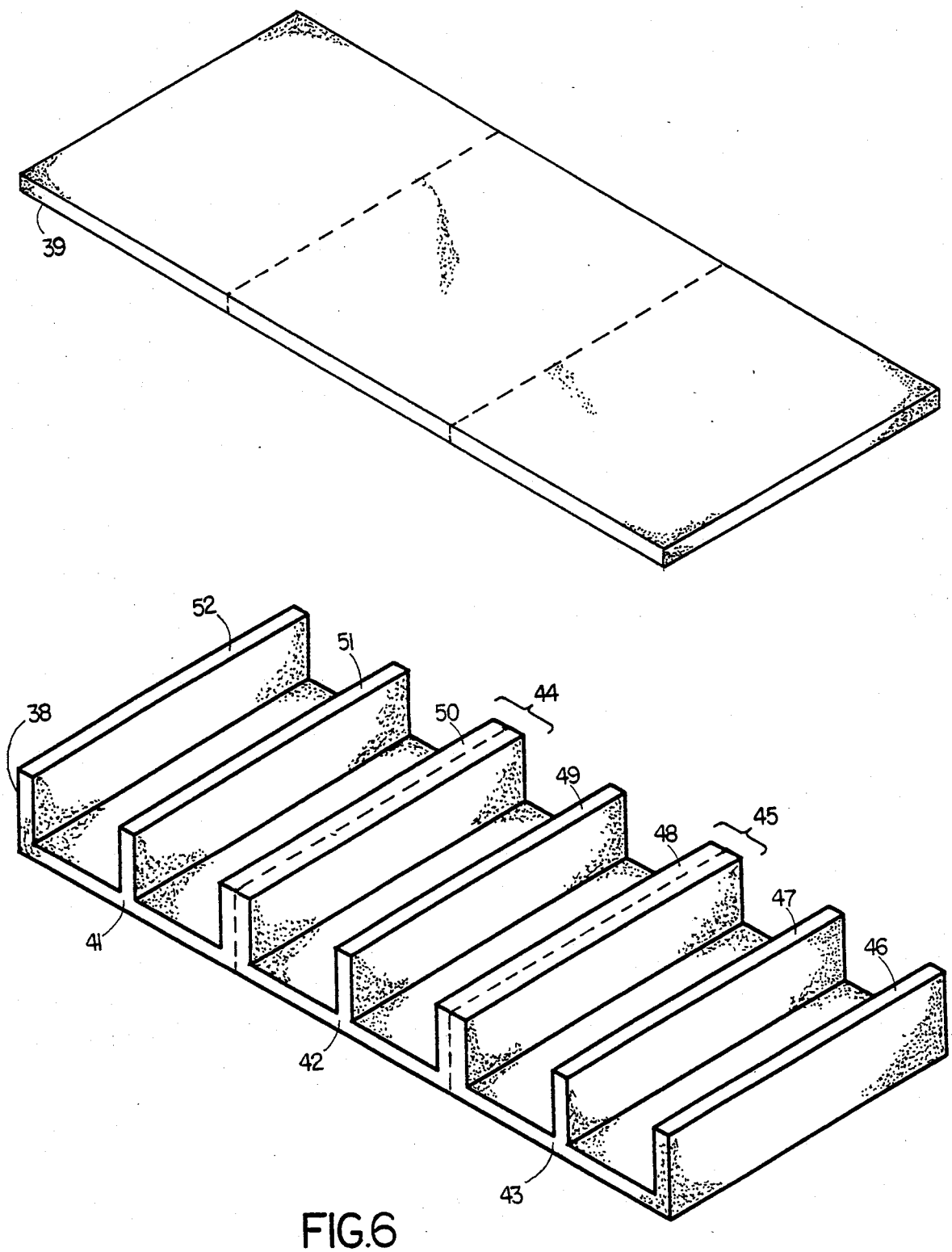
FIG. 6 is a schematic perspective drawing illustrating a system for making a plurality of box beams like that of FIG. 2 from unitary blocks.

As shown in FIG. 3, a single unitary parent block 16 is divided into a flat slab 18 and a body block 17 by cutting with a diamond saw blade 30 (rotary or band saw) on a work table 34. The cavities in body block 17 are then formed by a rotary diamond saw or a grinding wheel 36 as shown in FIG. 4. The plane of rotation of the wheel is parallel to the length of the block and to the boundary and gusset walls being formed. The block 17 is channelled all the way from one end to the other by running the grinding wheel 36 over the length of the block and then stepping the block laterally to a position where the next cut of the grinding wheel will overlap the preceding cut. Finally, the mating surfaces of the block 17 and slab 18 along their original interface are precision flat ground and sandblasted. The block 17 and slab 18 are then bonded together along their original interface to form the hollow granite gussetted box beam 37 as shown in FIG. 6, mounting holes 37a are preferably drilled before the steps of FIGS. 3 and 4 for attaching other equipment for a coordinate measuring machine, for example. However, the holes can be drilled afterwards, if desired.

After the beam has cured, the entire beam is precision surface ground and precision lapped.

The dimensions of a typical hollow granite block formed according to the invention for use in the previously identified coordinate measuring machine are as follows:

| | |
|---|---|
| length l: | 37½ inches |
| width w: | 11" inches |
| height h: | 3 5/32 inches |
| wall thickness | 0.75 inch |
| slab 18 thickness | 0.75 inch |

The ground walls and gusset in block 17 are preferably the same thickness as the slab 18.

In another embodiment, as illustrated in FIG. 3, a plurality of box beams, in this case three, 41, 42, 43, are prepared from a single component block 38. The granite is removed from the central cavities of the component block, as in the above described embodiments, except that the unremoved divider portions 44 and 45 have an unground portion with a width greater than that of the other unground portions (the gussets). For example, if the gussets are 0.75 inch, the divider portions would be 1.50 inch plus the saw kerf. Like the above described embodiments, all interfacial surfaces 46-52 are precision ground to be coplanar and are then sandblasted. On the second component block 39 the underside (not shown) is likewise precision flat ground and sandblasted for bonding. The various box beams are then separated by sawing at approximately the midplane of the unremoved divider portions. See dashed lines on component block 38. Likewise the second component block 39 is divided into second sections of the final box beams along dashed lines on component block 39 with the dimensions of the second sections corresponding identically with the respective first sections of the plurality of box beams.

Other embodiments are within the following claims.

I claim:

1. A method for constructing at least one box beam from at least two elongated component blocks of igneous rock, comprising the steps of:

forming at least one flat surface on each of said at least two component blocks, said at least two flat surfaces having identical dimensions;

removing igneous rock material from the flat surface of at least one of said component blocks so as to form at least one open cavity in said at least one component block, said at least one cavity having boundary walls of a predetermined thickness; and bonding together the said at least two component blocks along the remaining unremoved portions of said flat surfaces so as to form said box beam.

2. The method of claim 1, wherein said two elongated component blocks are formed by dividing a single elongated parent block parallel to a longitudinal axis of said parent block so as to form the two said component blocks.

3. The method of claim 2, wherein said two flat surfaces are formed by the division of said parent block.

4. The method of claim 2, wherein the parent block has a uniform cross-section.

5. The method of claim 4, wherein said parent block is a rectangular block.

6. The method of claim 2, wherein the parent block is divided into the two component blocks by sawing.

7. The method of claim 2, wherein the parent block is divided into the two component block by a single saw cut.

8. The method of claim 1, wherein igneous rock material is removed from only one of said component blocks to provide said open cavity, said method further comprising the step of:

removing said igneous rock material from said flat surface of said one component block so that, somewhere in said cavity, there exists an unremoved portion constituting a gusset, said gusset providing added support for said other component block after bonding, whereby the overall strength of said box beam after bonding is enhanced.

9. The method of claim 1, wherein igneous rock material is removed from both said component blocks to provide two said open cavities, said method further comprising the step of:

removing said igneous rock material from said flat surfaces of said two component blocks so that, in both said cavities, there exist unremoved portions constituting gussets, said gussets positioned in said cavities so as to intersect along their original interface upon bonding, whereby the overall strength of said box beam after bonding is enhanced.

10. The method of claim 1, comprising the further step of:
drilling mounting holes in either the block or the finished box beam to facilitate attachment of said box beam to another object.

11. The method of claim 1, wherein the removal of the igneous rock material is to a substantially uniform depth.

12. The method of claim 1, wherein the igneous rock material is removed over substantially the entire length of the block.

13. The method of claim 1, wherein the flat surfaces of said at least two component blocks are formed by sawing.

14. The method of claim 1, wherein the flat surfaces of said at least two component block are formed by single saw cuts.

15. The method of claim 1, wherein the removal of the igneous rock material is performed by grinding.

16. The method of claim 1, wherein the removal of the igneous rock material is performed by a grinding wheel with a plane of rotation parallel to said longitudinal axis of said one component block.

17. The method of claim 1, wherein the removal of the igneous rock material is performed by a series of stepwise grinding wheel cuts.

18. The method of claim 1, wherein the removal of the igneous rock material is performed by grinding with a grinding wheel to a desired depth, and then moving said one component block relative to said grinding wheel transversely to an overlapping position and repeating until said cavity is completely formed.

19. The method of claim 1, further comprising the step of precision grinding and sandblasting, before bonding, said remaining portions of unremoved igneous rock material.

20. The method of claim 1, wherein both said component blocks are rectangular blocks.

21. The method of claim 1, wherein the predetermined thickness of said boundary walls of said cavity is substantially uniform.

22. The method of claim 21, wherein the substantially uniform thickness of said boundary walls is 0.25 inches.

23. The method of claim 1, wherein a plurality of box beams are constructed from said two component blocks wherein the steps of
removing said igneous rock material from at least one of said component blocks is performed so that a plurality of interior cavities are provided in each of said component blocks, said interior cavities being separated by unremoved divider portions having a width greater than that of said predetermined thickness; and further comprising the steps of:
dividing a first component block longitudinally at approximately the center of unremoved divider portions to form first sections of each of the plurality of box beams;
dividing a second said component block longitudinally so as to form second sections of each of the plurality of box beams, the dimensions of each interfacial surface of said second sections being substantially identical with those of the corresponding said first section; and
said bonding step includes bonding together said first and second sections of each of said box beams along their respective interfacial surfaces.

24. The method of claim 23, wherein igneous rock material is removed from only one of said component blocks to provide said open cavities, said method further comprising the step of:
removing said igneous rock material from said flat surface of said one component block so that, somewhere in each of said cavities, there exists an additional unremoved portion constituting a gusset, said gusset providing added support for said second section of each box beam after bonding, whereby the overall strength of each of said box beams after bonding is enhanced.

25. The method of claim 23, wherein igneous rock material is removed from both said component blocks to provide open cavities in both said component blocks, said method further comprising the step of:
removing said igneous rock material from said flat surfaces of said two component blocks so that, in the cavities of both said component blocks, there exist additional unremoved portions constituting gussets, said gussets positioned in said cavities of both said component blocks so as to intersect along the respective interfacial surfaces upon bonding, whereby the overall strength of each of said resulting box beams after bonding is enhanced.

26. A box beam of igneous rock, comprising:
two component blocks of igneous rock at least one of said blocks having rock removed to form a cavity said block having mating flat surface forming a planar interface;
bonding means to adhere the two component blocks together along said interface so as to cover said cavity and form said box beam.

27. The box beam of claim 26, wherein said two component blocks are formed by dividing a single parent block.

28. The box beam of claim 27, wherein the parent block has a uniform cross-section.

29. The box beam of claims 26, wherein mounting holes are formed in said box beam to facilitate attachment of said box beam to another object.

30. The box beam of claim 26, wherein both said component blocks are rectangular blocks.

31. The box beam of claim 26, wherein the predetermined thickness of said boundary walls of said cavity is substantially uniform.

32. A box beam, comprising an integral body block of igneous rook of generally elongated rectangular shape having two open rectangular channels running the length of said block divided by a gusset wall and bounded by outer walls parallel to and of substantially identical dimensions as said gusset wall, said outer walls and gusset walls having substantially co-planar top surfaces, elongated rectangular slab of igneous rock bonded to said wall top surfaces to cover said channels.

33. The beam of claim 32 wherein said block and said slab are the same width.

34. The beam of claim 32 wherein said slab and said walls are the same thickness.

35. The beam of claim 34, wherein the thickness of the floor formed by said channels is the same as that of said walls and said slab.

* * * * *